United States Patent

[11] 3,593,764

[72] Inventor Claude Freeman Smith
  111 S.W. Harrison, Portland, Oreg. 97201
[21] Appl. No. 717,532
[22] Filed Apr. 1, 1968
[45] Patented July 20, 1971

[54] TIRE MOUNT
  2 Claims, 3 Drawing Figs.

[52] U.S. Cl. .................................................. 144/288 A,
  18/18 F, 18/45 T, 152/411
[51] Int. Cl. .................................................. B25h 5/00,
  B29h 5/18, B60b 25/22
[50] Field of Search .......................................... 18/18 F, 2
  TT, 45 T; 144/288.1; 152/401, 410, 411; 156/394,
  415, 500; 157/13

[56] References Cited
UNITED STATES PATENTS

| 3,238,982 | 3/1966 | Darr | 157/13 X |
|---|---|---|---|
| 3,354,927 | 11/1967 | Pile | 152/410 |
| 3,459,252 | 8/1969 | Verdier | 152/410 |
| 2,077,506 | 4/1937 | Woock | 18/18 (F) X |
| 2,871,518 | 2/1959 | Branick | 18/45 T |
| 2,992,675 | 7/1961 | Bakke | 144/288 (1) X |
| 3,331,412 | 7/1967 | Sornsen | 144/288 (1) |

Primary Examiner—Benjamin A. Borchelt
Assistant Examiner—Stephen C. Bentley
Attorney—Kolisch & Hartwell ABSTRACT: An adjustable tubeless tire mount including two hollow cylindrical rim sections with one section telescoping into the other section adjacent their one set of ends, laterally spaced-apart flanges extending about the opposite set of ends of the rim sections and projecting radially outwardly therefrom, O-ring seals extending about the radially outward surface of the one rim section in the region of telescopic joinder between the two rim sections providing an airtight seal between the rim sections, and an O-ring seal extending about each rim section adjacent its associated flange, against which opposing beads of a tire abut to form airtight seals between the flanges and the tire beads. Adjustable securing means connect the sections preventing telescoping of the sections axially outwardly from each other.

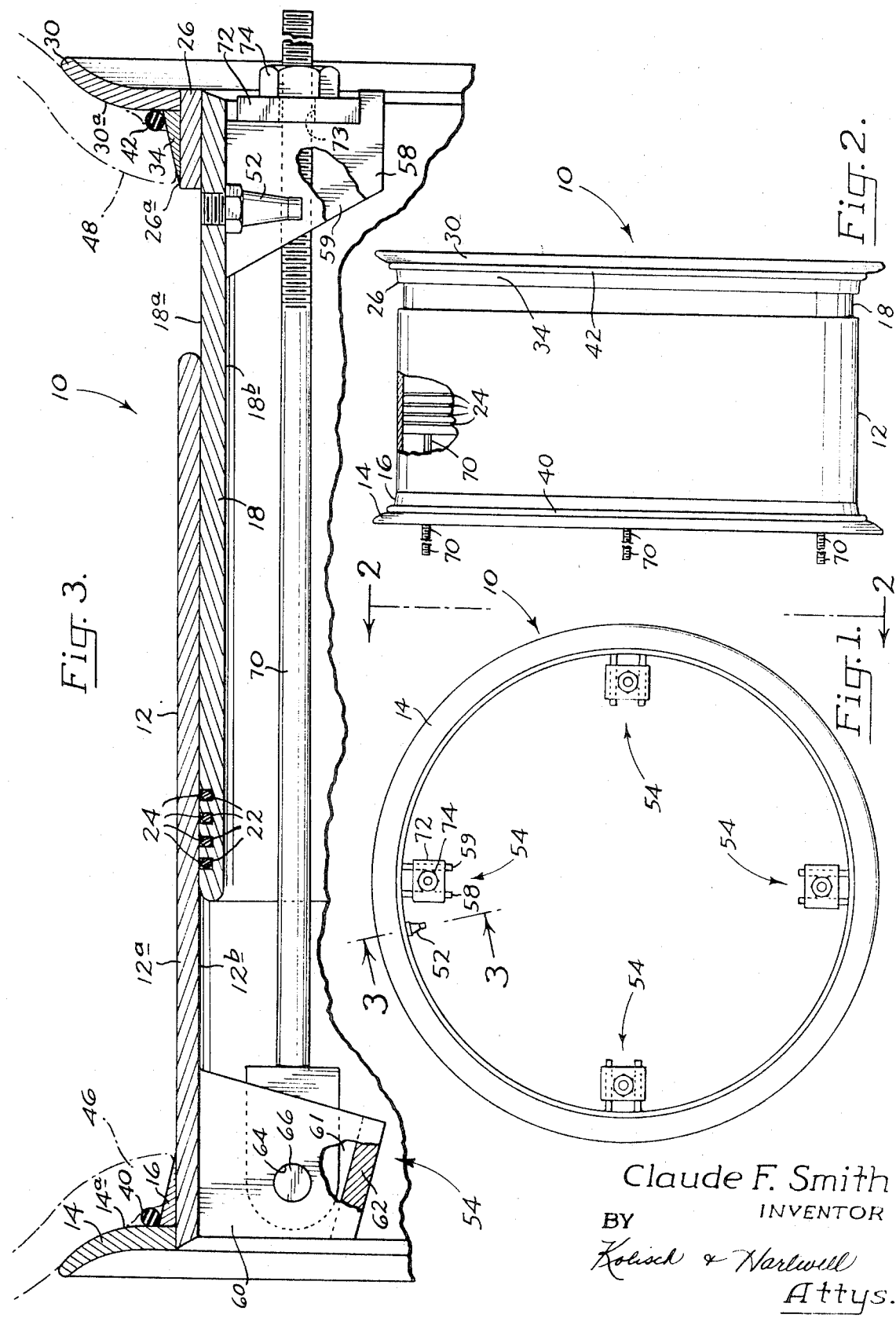

TIRE MOUNT

This invention relates to a tire mount and, more specifically, to a tire mount which permits a tire mounted thereon without a tube to be inflated and to maintain air pressure, yet is adjustable to mount tires of different widths.

When it is necessary to work on a vehicle tire, as in the processes of inspection, buffing, retreading, recapping, curing, etc., the tire must be removed from the vehicle and then inflated and air pressure maintained. Mounting means are required for the tires which means will accommodate tires of varying sizes. Tires vary in their diameters and tread widths and it is not practical to have a separate mount for each size. However, many tires of varying tread widths have the same diameter and a common mount which is axially adjustable may be employed for such tires.

Commonly in the past with both tube and tubeless-type tires, when the tires were placed on a mount an inner tube was inserted in the tire to inflate it and to maintain air pressure. It is considerably more cumbersome to mount a tire with a tube and often the tube is damaged in the mounting or work process. Thus, it is also desirable to provide an airtight tire mount which permits inflating a tire on the mount and maintaining pressure therein without the need of a tube.

A general object of the invention is to provide a novel tire mount which takes care of the above-noted problems in a satisfactory and economic manner.

More specifically, an object is to provide a tire mount which includes a pair of rim sections which are movable axially relative to each other with sealing means between the two rim sections providing an airtight seal therebetween throughout such axial movement.

Another object is to provide such a novel tire mount which has flanges extending radially outwardly from opposite ends of the mount against which the outer surfaces of opposing beads of a tire may abut when on the mount and sealing means between such tire beads and the flanges to provide an airtight seal between the flanges and the beads permitting the tire to be inflated and to maintain air pressure without need of an inner tube.

Yet another object is to provide such a novel tire mount which has adjustable and releasable securing means for controlling the lateral spacing and alignment of the flanges on the rim sections and for securing the rim sections against movement axially outwardly from each other.

These and other objects and advantages of the invention will become more fully apparent as the following description is read in conjunction with the drawings, wherein:

FIG. 1 is an end elevation view of a tire mount constructed in accordance with an embodiment of the invention;

FIG. 2 is a side elevation view of the tire mount taken along the line 2—2 in FIG. 1; and FIG. 3 is an enlarged cross-sectional view of a portion of the tire mount taken along the line 3—3 in FIG. 1.

Referring now to the drawings, at 10 is indicated generally a tire mount constructed in accordance with an embodiment of the invention. The tire mount comprises a first hollow cylindrical rim section 12 having a flange 14 which extends continuously around the rim section and projects radially outwardly therefrom. Rim section 12 has a radially outwardly facing surface 12a and a radially inwardly facing surface 12b, while flange 14 has an axially inwardly facing surface 14a, as is best seen in FIG. 3. Ramp element 16 extends continuously about rim section 12 between rim surface 12a and flange surface 14a. As best seen in FIG. 3, ramp element 16 has a triangular cross section causing it to have a gradually decreasing outer diameter from left to right.

The tire mount further comprises a second hollow cylindrical rim section 18 which has a radially outwardly facing surface 18a and a radially inwardly facing surface 18b. The outer diameter of rim section 18 is slightly less than the inner diameter of rim section 12 and rim section 18 in concentric with and is received telescopically within rim section 12 as illustrated in FIGS. 2 and 3. A region thus is provided where a portion of rim section 12 overlaps a portion of rim section 18.

A plurality of grooves 22 are defined in outer surface 18a of the second rim section and extend circumferentially about this rim section. O-ring seals 24 are placed in grooves 22, with one seal in each of the grooves and with each seal extending continuously about rim section 18. Each of seals 24 has a cross-sectional diameter which is slightly greater than the depth of the annular groove within which it is placed and thus, with the rim sections telescopically joined as shown in FIGS. 2 and 3, seals 24 press tightly against inner surface 12b of rim section 12 to effect an airtight seal between the two rim sections in the region of telescopic joinder between the rim sections, throughout any axial movement which might take place between the two rim sections. The O-ring seals may be constructed of any suitable material, such as neoprene or rubber, which will provide sufficiently flexibility and resiliency to maintain an airtight seal between the two rim sections.

A band 26 is secured to and extends circumferentially about rim section 18 adjacent the end of rim section 18 opposite the end which is telescopically received within rim section 12. Band 26 has a radially outwardly facing surface 26a which has substantially the same outer diameter as outer surface 12a of rim section 12.

Flange 30 is mounted on band 26 and extends continuously about rim section 18 and projects radially outwardly therefrom. Flange 30, as is best seen in FIG. 3, has a cross-sectional configuration similar to that of flange 14 and has an axially inwardly facing inner surface 30a which is spaced laterally from and opposes inner surface 14a of flange 14. A ramp element 34, similar to ramp element 16, extends continuously about band 26 between flange surface 30a and band surface 26a with a gradually increasing outer diameter from left to right as seen in FIG. 3.

An O-ring seal 40, also referred to as bead-sealing means, encircles rim section 12 at the juncture of flange 14 and ramp 16. Similarly, another O-ring or bead-sealing means 42 encircles rim section 18 at the juncture of flange 30 and ramp 34. Opposing beads of a tire mounted on the tire mount are illustrated in dot and dashed outline at 46, 48 adjacent opposite sides of FIG. 3, and as is seen, the outer surfaces of beads 46, 48 abut O-ring seals 40, 42, respectively.

Referring still to FIG. 3, an air valve 52 is screwed into an accommodating threaded bore in rim section 18 adjacent band 26. Valve 52 operates in a conventional manner, permitting air under pressure to be forced from an external source through the valve and into the interior of a tire on the mount, and preventing air from escaping from such tire through the valve until release mechanism in the valve is actuated.

Spaced apart at equal intervals circumferentially about the interior of the tire mount are multiple adjustable and releasable securing means 54. The securing means are each similar in construction and thus only one will be described in detail. The securing means comprises a pair of lugs 58, 59, rigidly mounted on the inner surface 18b of rim section 18 and projecting radially inwardly therefrom. Each of lugs 58, 59 has the outline generally illustrated for lug 58 in FIG. 3. The lugs are spaced apart a short distance as illustrated adjacent the top of FIG. 1. Secured to and projecting radially inwardly from the inner surface 12b of rim section 12 are a pair of ears 60, 61 with each ear having the outline illustrated for ear 60 in FIG. 3. Ears 60, 61 are spaced apart a short distance in the same manner as are lugs 58, 59. A stop plate 62 spans the distance between ears 60, 61 adjacent the radially inward margins of the ears and is secured along opposite edges to each of such ears. Each of ears 60, 61 has a bore therethrough such as that indicated at 64 for ear 60 in FIG. 3. A pin 66 extends through the bores in ears 60, 61 and across the space separating the two ears.

An elongated bolt 70 is pivotally mounted adjacent one of its ends on pin 66. The bolt is adapted to be swung in an arc radially inwardly of the rim sections from the position shown in FIG. 3 in which it parallels the axis of the rim sections to positions at substantial angles to said axis. Stop plate 62 which interconnects ears 60, 61 acts to limit the arc through which the bolt may swing inwardly.

Bolt 70 is threaded along a portion of its length adjacent the end of the bolt opposite its pivotal mounting and a segment of this threaded portion is removably received on the threaded portion is removably received in the opening between lugs 58, 59. A rectangular plate washer 72 having a bore 73 extending therethrough is received on the threaded potion of bolt 70 axially outwardly of lugs 58, 59, and a nut 74 is screwed onto this threaded portion of the bolt beyond washer 72. Turning nut 74 on the bolt in such a direction that it advances to the left in FIG. 3 urges rim sections 12 and 18 to move axially inwardly relative to each other, thereby bringing flanges 14 and 30 closer together. Turning nut 74 so that it advances to the right in FIG. 3 permits movement of the rim sections axially outwardly relative to each other. Advancing nut 74 to the right in FIG. FIG. 3 also permits washer 72 to be moved on bolt 70 to the right in FIG. 3 and beyond the lip presented by the lugs, thereby allowing the bolt to be swung in a radially inwardly direction to remove it from its position between lugs 58, 59.

To mount a tire on the tire mount of the invention, bolts 70 of the securing means are swung to their radially inward positions and rim sections 12 and 18 are separated one from the other. A tire to be mounted on the tire mount is slipped onto rim section 12 with one of its beads assuming the position illustrated by dot and dashed outline 46. As bead 46 is forced toward an engagement with flange 14, the inner periphery of the bead rides up on ramp element 16 to produce a secure engagement between the inner periphery of the tire bead and this rim section. Once bead 46 is firmly seated on rim section 12, the unflanged end of section 18 is inserted for telescopic movement in rim section 12. Movement of rim section 18 axially inwardly relative to rim section 12 moves flanges 12 and 30 closer together, thus bringing band 26 and ramp element 34 on rim section 18 into such a position that tire bead 48 rides up and onto ramp element 34, and the outer side of bead 48 comes into contact with the inner surface of flange 30, as is shown in FIG. 3. With bead 48 riding up on ramp element 34 a firm engagement is thus produced between this tire bead and rim section 18.

After flanges 12 and 30 have been brought into contact with the sides of beads 46, 48, respectively, bolts 70 in each of the securing means are swung into the position illustrated in FIG. 3 and nuts 74 are advanced to the left on such bolts to bring plate washers 72 securely against lugs 58, 59. Selective tightening of nuts 74 around the tire mount permits rim sections 12 and 18 to be moved axially relative to each other until their respective flanges are securely contacting opposing outer surfaces of the tire beads and the inner surfaces of such flanges are equally spaced apart from each other about the circumference of the tire mount.

Introduction of air under pressure through valve 52 to the interior of the tire causes tire beads 46, 48 to press axially outwardly against flanges 12, 30 and O-ring seals 40, 42. Thus seals 40, 42 provide airtight seals about opposing beads on the tire on the tire mount. O-ring seals 24 provide an airtight seal between rim sections 12 and 18 thereby permitting air pressure to be maintained within the tire. Air pressure acting against beads 40, 46 create a force which tends to move the rim sections axially outwardly and away from each other, but this force is resisted by securing means 54. When it is desired to remove the tire from the tire mount, air is permitted to escape from the tire through valve 52 and the above-described procedure is reversed.

While there has been described an embodiment of the invention, variations and modifications are possible without departing therefrom. It is desired to cover all such modifications and variations as would be apparent to one skilled in the art and that come within the scope of the appended claims.

I claim:

1. A tire mount on which a tubeless tire may be mounted comprising
    a first hollow cylindrical rim section having a substantially constant cross section throughout its axial length with its outer diameter substantially equaling the inner diameter of the bead of a tire to be mounted thereon, a bead-engaging flange extending continuously about one end of said rim section and projecting radially outwardly therefrom, and a ramp element extending continuously about said rim section adjacent said flange, said ramp element at its inner edge in a region spaced axially inwardly on the rim section from said flange having a diameter substantially equal to the outer diameter of the rim section and increasing in diameter on progressing toward said flange,
    a second hollow cylindrical rim section having a substantially constant cross section throughout its axial length with its outer diameter being slightly less than the inner diameter of the first rim section, a bead-engaging flange extending continuously about one end of the second rim section and projecting radially outwardly therefrom, and a ramp element extending continuously about said rim section adjacent said flange, said ramp element increasing in diameter on progressing toward said flange,
    said first and second rim sections being disposed concentrically, each rim section extending from its associated bead-engaging flange toward the bead-engaging flange on the other rim section with a portion of the second rim section being overlapped by the first rim section in a region between said flanges and being slidable telescopically within the first rim section, whereby the rim sections may be moved axially relative to each other to place said flanges in various adjusted spaced positions to accommodate tires of varying widths with the rim sections maintained in overlapping relation,
    an annular groove in the outer surface of said second rim section in the region of overlap,
    an O-ring seal set in said annular groove and projecting out from said groove for sealing engagement with the inner surface of said first rim section to provide a substantially airtight seal between the rim sections throughout relative axial movement between them,
    multiple adjustable securing means disposed radially outwardly from the axial center of said rims and adjacent said rim sections for locking said first and second rim sections against relative axial movement outwardly and away from each other with said flanges in a given adjusted position,
    O-ring seals adjacent the inwardly facing surfaces of said flanges against which seals opposing side beads of a tire mounted on the tire mount may abut to form airtight seals between such side beads and the flanges, and
    an air inlet valve secured to and projecting radially inwardly of the second rim section in a region adjacent the inner edge of the ramp element on said second rim section.

2. The tire mount of claim 1 wherein said securing means are spaced apart circumferentially about the inner surface of said second rim section.